(12) United States Patent
Kotani et al.

(10) Patent No.: US 9,811,189 B2
(45) Date of Patent: Nov. 7, 2017

(54) DISPLAY DEVICE

(71) Applicant: Japan Display Inc., Tokyo (JP)

(72) Inventors: Yoshihiro Kotani, Tokyo (JP); Hiroshi Mizuhashi, Tokyo (JP); Hayato Kurasawa, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 343 days.

(21) Appl. No.: 14/732,237

(22) Filed: Jun. 5, 2015

(65) Prior Publication Data

US 2015/0355766 A1 Dec. 10, 2015

(30) Foreign Application Priority Data

Jun. 5, 2014 (JP) .................. 2014-116693

(51) Int. Cl.
| | |
|---|---|
| G06F 3/041 | (2006.01) |
| G06F 3/044 | (2006.01) |
| G09G 3/36 | (2006.01) |
| G02F 1/1333 | (2006.01) |

(52) U.S. Cl.
CPC ............ *G06F 3/0412* (2013.01); *G06F 3/044* (2013.01); *G06F 3/0416* (2013.01); *G09G 3/3614* (2013.01); *G09G 3/3648* (2013.01); *G09G 3/3688* (2013.01); *G02F 1/13338* (2013.01); *G09G 2310/0291* (2013.01); *G09G 2310/08* (2013.01); *G09G 2354/00* (2013.01)

(58) Field of Classification Search
CPC .. G06F 3/0412; G06F 3/0416; G02F 1/13338; G09G 3/3648

USPC .................................................. 345/173, 174
See application file for complete search history.

(56) References Cited

U.S. PATENT DOCUMENTS

| | | | | |
|---|---|---|---|---|
| 8,754,839 | B2* | 6/2014 | Koyama ................. | G09G 3/36 345/100 |
| 9,092,087 | B2* | 7/2015 | Ishizaki ................ | G06F 3/0412 |
| 2011/0267293 | A1 | 11/2011 | Noguchi et al. | |
| 2013/0188104 | A1 | 7/2013 | Aoki et al. | |
| 2014/0152616 | A1 | 6/2014 | Kida et al. | |

FOREIGN PATENT DOCUMENTS

JP 2013-152291 A 8/2013

* cited by examiner

*Primary Examiner* — Calvin C Ma
(74) *Attorney, Agent, or Firm* — Typha IP LLC

(57) ABSTRACT

A display device comprises gate lines extending in a first direction, drain lines extending in a second direction, common electrodes extending in the second direction, and a drive circuit. The common electrodes are configured to be partitioned over drain lines of pixels of a specific color and to be used also as touch panel scan electrodes. The drive circuit is configured so that write periods for driving the gate lines and touch sensing periods for driving the scan electrodes are alternately repeated in each frame period, signal polarity of drain lines for colors other than the specific color is inverted every frame, signal polarity of drain lines for the specific color is inverted at a cycle shorter than one frame, and the cycle of the signal polarity inversion of the drain lines for the specific color can be changed.

20 Claims, 24 Drawing Sheets

FIG.1C
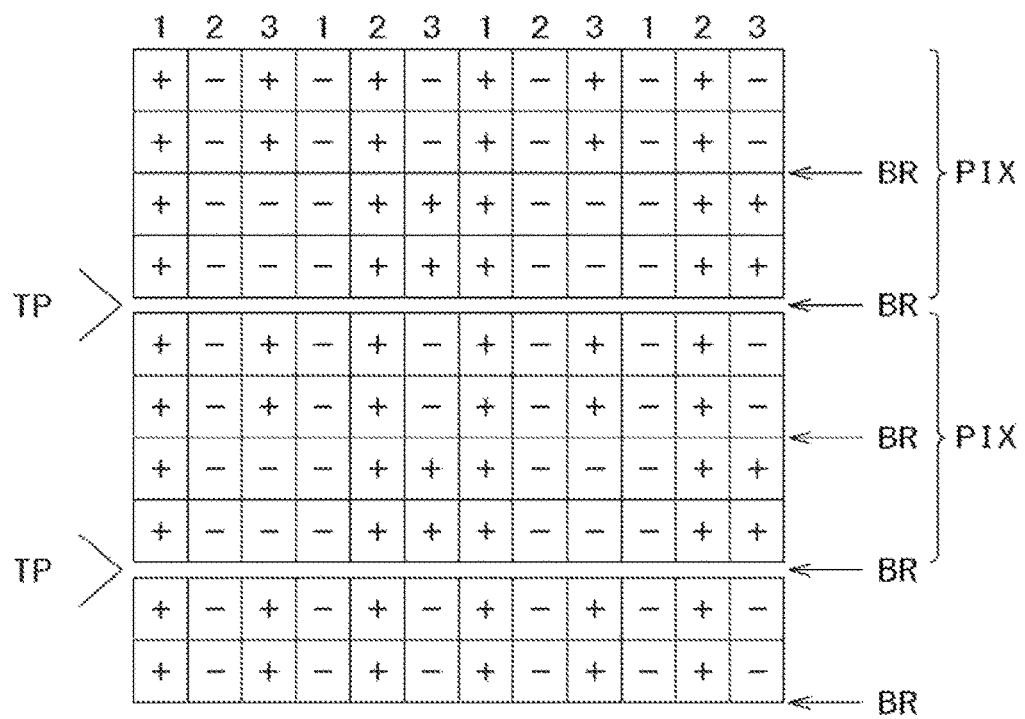
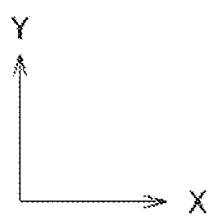

FRAME N  FRAME N+1

TBR →

TBR →

FIG. 15

FORWARD SCAN

| UNIT0 | + | 24 LINES |
|---|---|---|
| UNIT1 | − | 24 LINES |
| UNIT2 | + | 24 LINES |
| UNIT3 | − | 24 LINES |
| . | . | . |
| . | . | . |
| UNIT104 | + | 24 LINES |
| UNIT105 | − | 24 LINES |
| INVALID | + | 16 LINES |

BLUE

FIG. 16

REVERSE SCAN

| INVALID | − | 16 LINES |
|---|---|---|
| UNIT105 | + | 24 LINES |
| UNIT104 | − | 24 LINES |
| UNIT103 | + | 24 LINES |
| . | . | . |
| . | . | . |
| UNIT2 | − | 24 LINES |
| UNIT1 | + | 24 LINES |
| UNIT0 | − | 24 LINES |

BLUE

DISPLAY DEVICE

CLAIM OF PRIORITY

The present application claims priority from Japanese patent application JP2014-116693 filed on Jun. 5, 2014, the content of which is hereby incorporated by reference into this application.

BACKGROUND

The present disclosure relates to a display device. The present disclosure is applicable to display devices having a touch panel of the in-cell type, for example.

In recent years, capacitive touch panels for the input function are being more and more introduced into liquid crystal display devices for mobile devices as typified by smartphones. Further, conversion of the capacitive touch panels into the in-cell type (i.e., incorporating the function of the capacitive touch panel into the liquid crystal display device) is in progress.

In a display device disclosed in JP-2013-152291-A (hereinafter referred to as "Patent Literature 1"), each counter electrode (common electrode) is partitioned into multiple parts in order to be used also as touch panel scan electrodes (scan electrodes for the touch panel). The partitioning regions of the counter electrodes are formed to extend in the row direction of the display device (scan line extension direction).

SUMMARY

If the common electrodes (touch panel scan electrodes) extend in the direction of the scan lines (gate lines) as in the Patent Literature 1, the load on the touch panel scan electrodes becomes heavy since all the video signal lines (drain lines) intersect with the touch panel scan electrodes.

The other problems and new features will become apparent from the description of the present disclosure and the accompanying drawings.

The outline of a typical configuration in the present disclosure can be described briefly as follows:

A display device comprises an array substrate, a counter substrate and a drive circuit. The array substrate includes gate lines extending in a first direction, drain lines extending in a second direction different from the first direction, and common electrodes extending in the second direction. The counter substrate includes sensing electrodes extending in the first direction. The common electrodes are configured to be partitioned over drain lines of pixels of a specific color and to be used also as touch panel scan electrodes. The drive circuit is configured so that write periods for driving the gate lines and touch sensing periods for driving the scan electrodes are alternately repeated in each frame period, signal polarity of drain lines for colors other than the specific color is inverted every frame, signal polarity of drain lines for the specific color is inverted at a cycle shorter than one frame, and the cycle of the signal polarity inversion of the drain lines for the specific color can be changed.

BRIEF DESCRIPTION OF THE DRAWINGS

FIG. 1C is a schematic diagram for explaining a display device according to the embodiment.

FIG. 9 is a schematic diagram for explaining column inversion driving.

FIG. 10 is a schematic diagram for explaining a driving method according to the embodiment.

FIG. 13A is a schematic diagram for explaining the relationship between frames in the display device driving method according to the example.

FIG. 15 is a schematic diagram for explaining a forward scan of the display device according to the example.

FIG. 16 is a schematic diagram for explaining a reverse scan of a display device according to a comparative example 2.

DESCRIPTION OF THE PREFERRED EMBODIMENTS

Figure 1A:
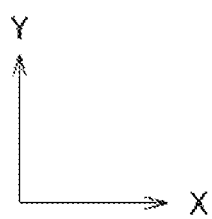
FIG. 1A is a schematic diagram for explaining a display device in accordance with an embodiment of the present disclosure.

Referring now to the drawings, a description will be given in detail of a preferred embodiment (examples, comparative examples and modifications). Incidentally, the present disclosure is given just as an instance for illustration, and modifications that can easily be conceived of by those skilled in the art without departing from the content of the present invention should naturally be contained in the scope of the present invention. While the drawings can indicate the width, thickness, shape, etc. of each part rather schematically compared to the actual mode of implementation for the sake of clarifying the explanation, the drawings are just examples for illustration and should not limit the interpretation of the present invention. In the description and drawings, elements equivalent to those already explained with reference to an aforementioned drawing are assigned the already-used reference characters and detailed explanation thereof can be omitted properly.

Embodiment

First, a display device in accordance with an embodiment of the present disclosure will be described below by referring to FIGS. 1A-1C.

Figure 1B:
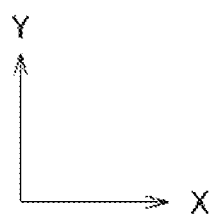
FIG. 1B is a schematic diagram for explaining a display device according to the embodiment.

FIGS. 1A-1C are schematic diagrams for explaining a driving method for the display device according to the embodiment.

The display device of this embodiment is configured so that drain lines for colors (1, 2) other than a specific color (3) are driven by means of column inversion driving and a setting can be made on whether or not to invert the polarity of drain lines for the specific color (3) every some write periods or every some gate line scans. Incidentally, the drain lines are referred to also as signal lines and video signal lines.

FIG. 1A shows a driving method inverting the signal polarity of the drain lines for the specific color 3 every write period (PIX). In other words, the signal polarity is inverted (BR) in touch sensing periods (TPs). The signal polarity of the drain lines for the colors 1 and 2 other than the specific color 3 is not inverted. In FIG. 1A, the symbol + indicates that the signal in the drain line and the subpixel written in from the drain line are in the positive polarity, while the symbol − indicates that the signal in the drain line and the subpixel written in from the drain line are in the negative polarity. Each touch sensing period (TP) exists between adjacent write periods (PIXs). The drain lines extend in the Y direction, while the gate lines extend in the X direction.

FIG. 1B shows a driving method inverting the signal polarity of the drain lines for the specific color 3 every two write periods (PIXs). In other words, the signal polarity can be inverted (BR) or not inverted in a touch sensing period (TP). The cycle of the signal polarity inversion is not restricted to two write periods; the signal polarity can be inverted every p write periods (p: integer larger than 1).

FIG. 1C shows a driving method inverting the signal polarity of the drain lines for the specific color 3 every ½ write periods. The signal polarity is inverted (BR) not only in the touch sensing periods (TPs) but also in the middle of each write period (PIX). The cycle of the signal polarity inversion is not restricted to ½ write periods; the signal polarity can be inverted every 1/p write periods (p: integer larger than 1) or every q gate line scans (q: integer larger than 1).

The cycle of the signal polarity inversion of the drain lines for the specific color 3 shown in FIGS. 1A-1C is determined by setting a value in a storage circuit (register, memory, etc.) of a driver IC (drive circuit) which will be explained later. For example, the display device of this embodiment may be configured to invert the signal polarity of the drain lines for the specific color 3 every n write periods. Here, n is a natural number or can also be a decimal number or a fractional number.

EXAMPLE

Figure 2:
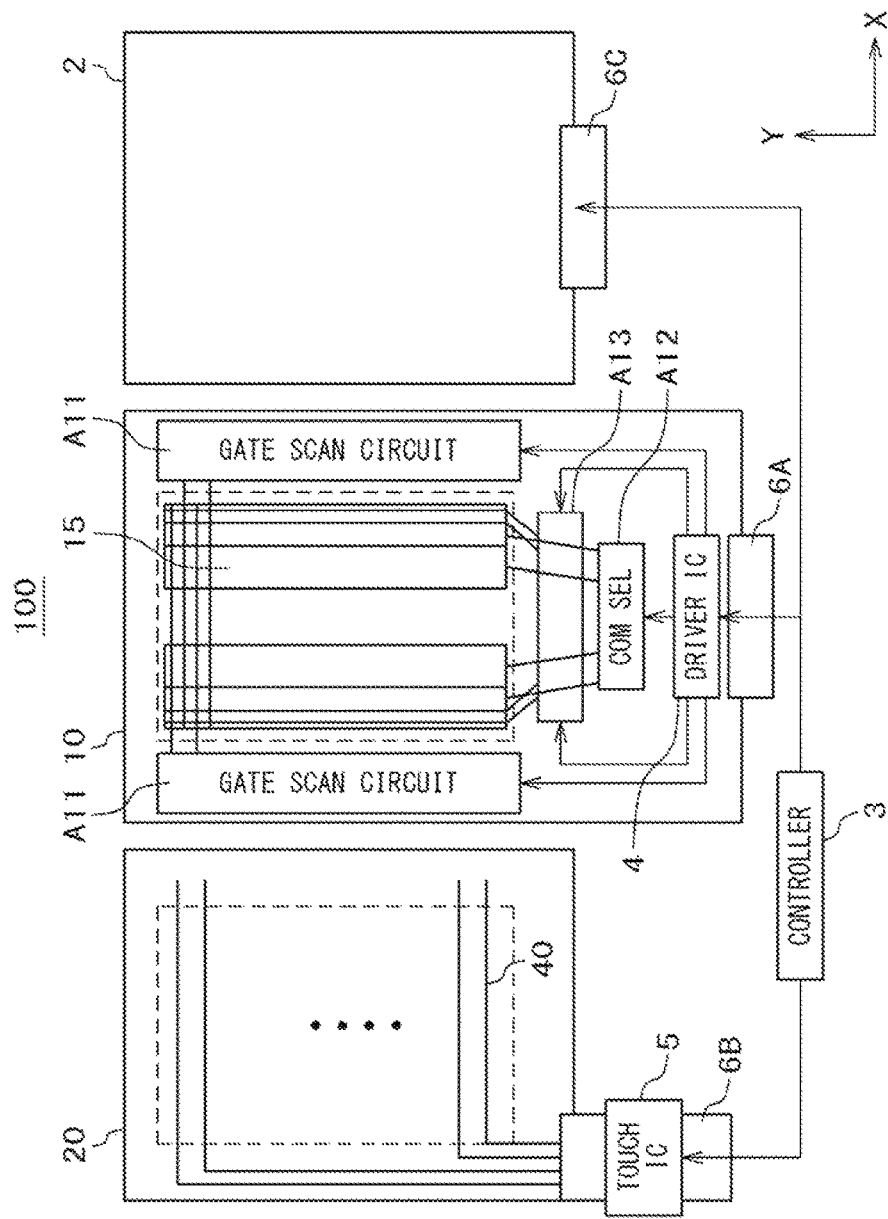
FIG. 2 is a plan view showing the configuration of a display device in accordance with an example of the present disclosure.
Figure 3:
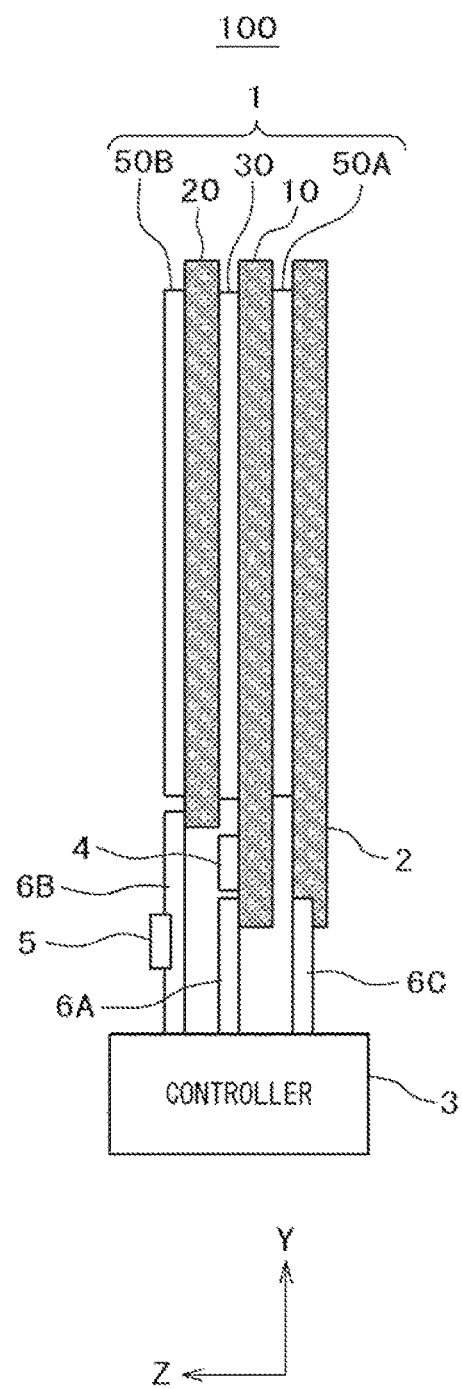
FIG. 3 is a side view showing the configuration of the display device according to the example.
Figure 4:
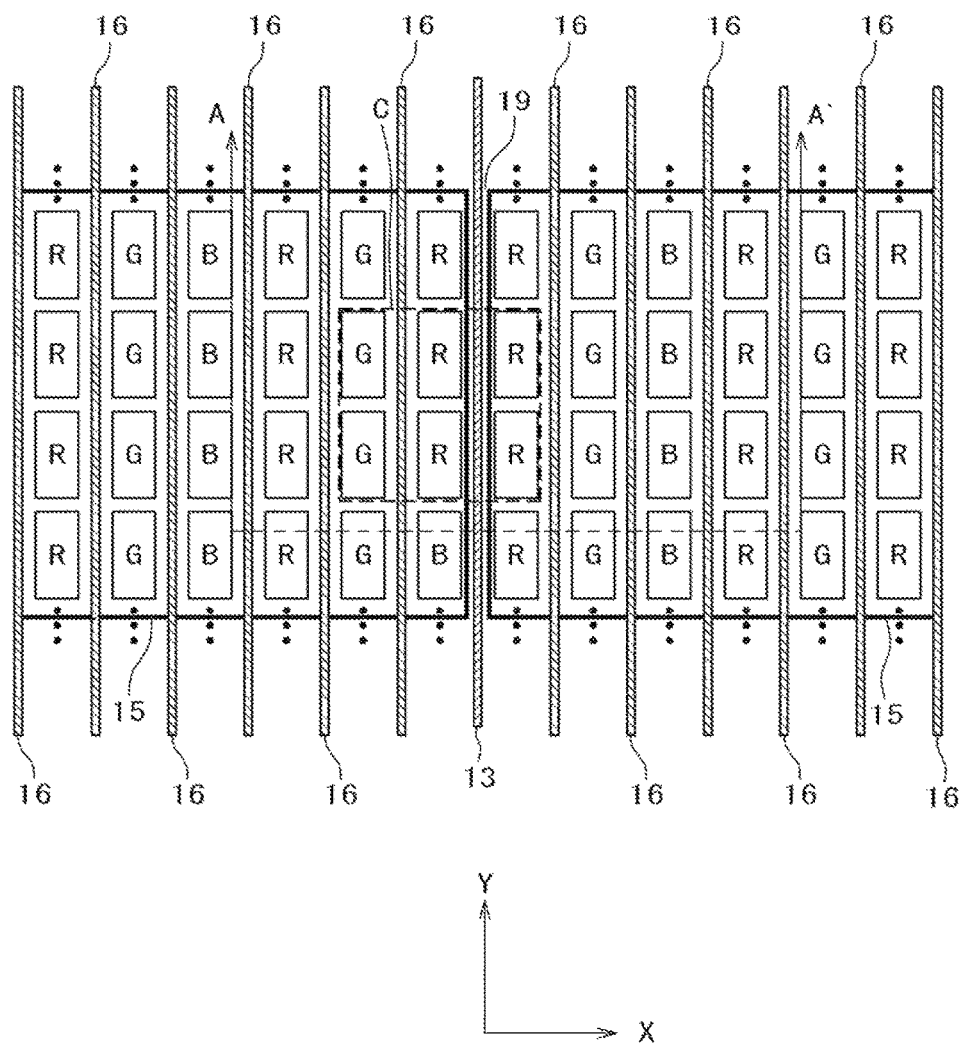
FIG. 4 is a plan view for explaining the configuration of the display device according to the example.
Figure 5:
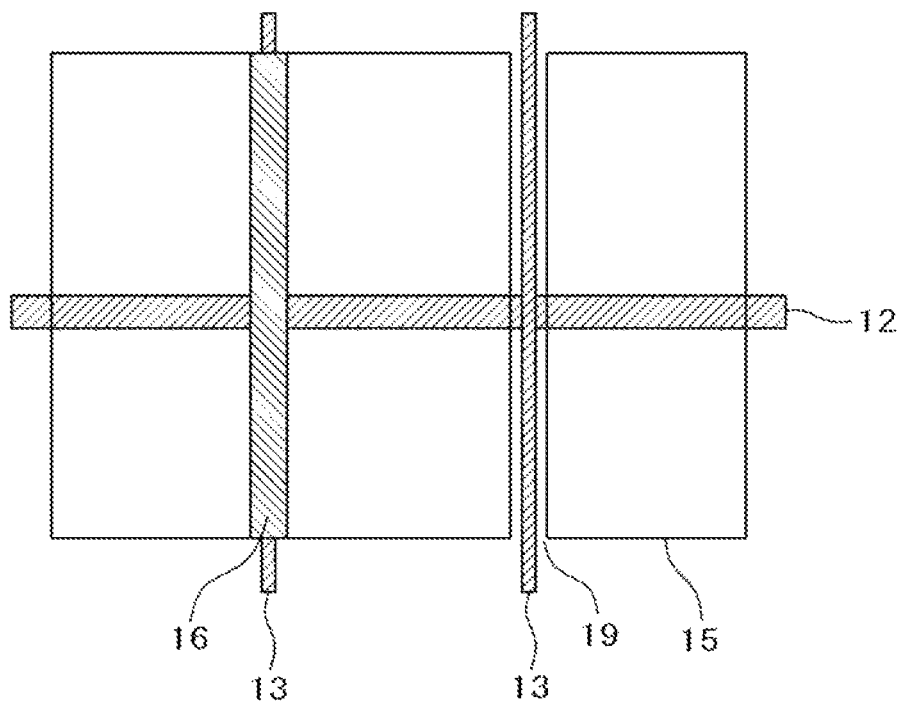
FIG. 5 is an enlarged view of a part C (broken line) in FIG. 4.
Figure 6:
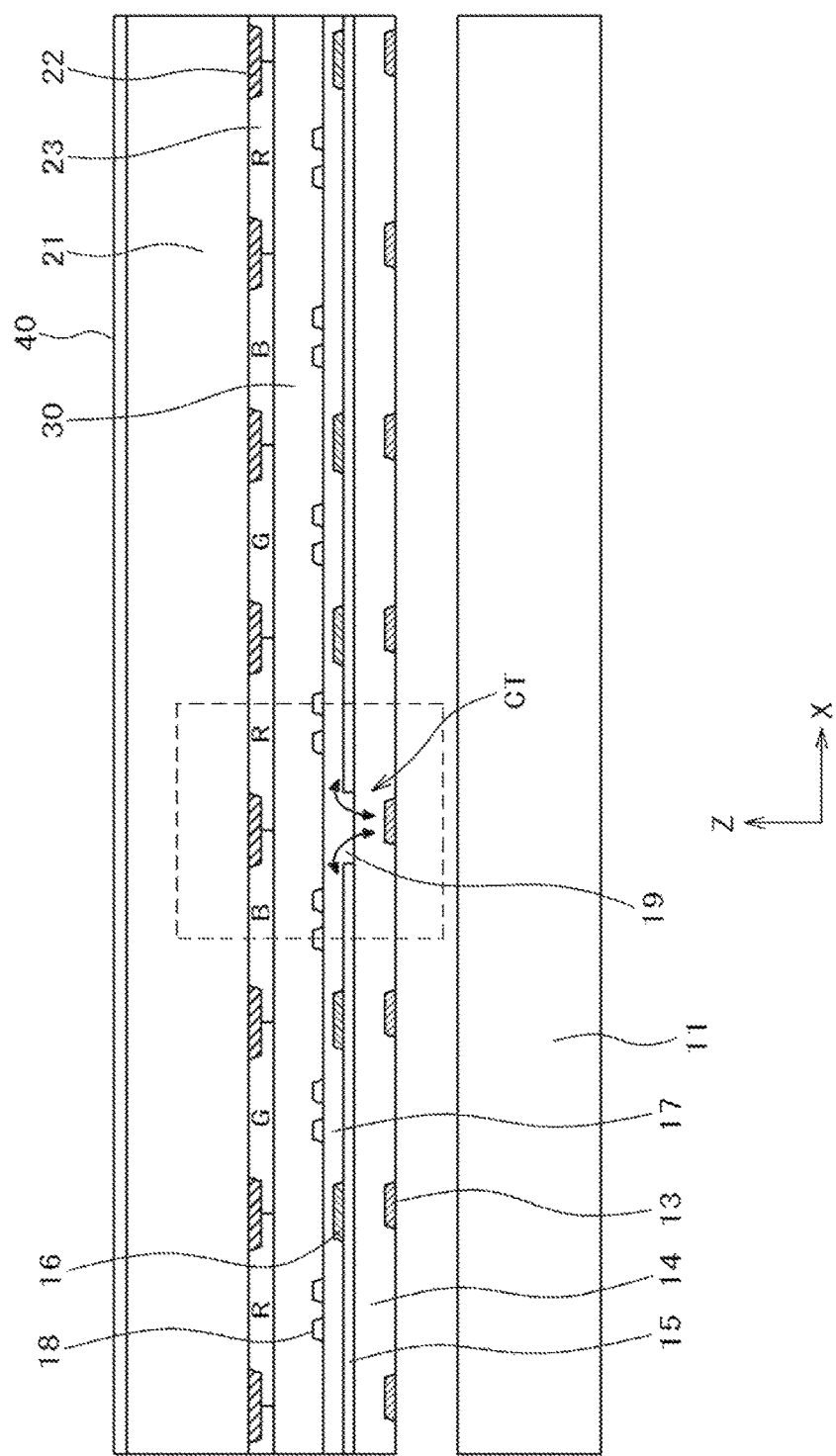
FIG. 6 is a cross-sectional view taken along a line A-A' in FIG. 4.

The configuration and structure of a display device in accordance with an example of the present disclosure will be described below by referring to FIGS. 2-6. FIG. 2 is an exploded plan view for explaining the configuration of the display device according to the example. FIG. 3 is a side view for explaining the configuration of the display device according to the example. FIG. 4 is a plan view for explaining the configuration of the display device according to the example. FIG. 5 is an enlarged view of a part C (broken line) in FIG. 4. FIG. 6 is a cross-sectional view taken along a line A-A' in FIG. 4.

The display device 100 according to this example has the touch panel function of the in-cell type, in which the common electrodes serve also as touch panel scan electrodes (scan electrodes for the touch panel).

The display device 100 comprises a display panel 1, a back light 2, a controller (control circuit) 3, a driver IC 4, a touch IC 5, and cables 6A, 6B and 6C. The display panel 1 includes an array substrate 10, a counter substrate 20, a liquid crystal layer 30, and polarizing plates 50A and 50B. A gate scan circuit A11, a common electrode selection circuit (COM SEL) A12 and a signal line selection circuit A13 are formed on the array substrate 10 by using TFTs (Thin Film Transistors). Further, the driver IC 4 formed by a CMOS circuit on a silicon substrate is mounted on the array substrate 10 by COG (Chip on Glass) mounting. The driver IC 4 is connected to the controller 3 via the cable 6A. A plurality of sensing electrodes 40 extending in the X direction are formed on the upper surface of the counter substrate 20 on the side opposite to the liquid crystal layer 30. The sensing electrodes 40 are connected to the touch IC 5 (which is mounted on the cable 6B) via the cable 6B. The cable 6B is connected to the controller 3. The back light 2 is connected to the controller 3 via the cable 6C. The polarizing plate 50A is arranged between the back light 2 and the array substrate 10, while the polarizing plate 50B is arranged on the upper surface of the counter substrate 20.

The common electrodes 15 (serving also as the touch panel scan electrodes) extend in the Y direction. The common electrodes 15 are partitioned in the X direction and arranged periodically. The plurality of sensing electrodes 40 extending in the X direction are arranged in the Y direction. Thanks to the extension of the common electrodes 15 (touch panel scan electrodes) in the Y direction, the common electrodes 15 are connected to the drain lines 13 while maintaining the output of the driver IC 4 in the high-impedance (Hi-z) state, by which the driving of the scan electrodes 15 can be assisted also from the drain lines 13 while ignoring the capacitance between the touch panel scan electrodes 15 and the drain lines 13. Consequently, the speeding up of the writing to the scan electrodes 15 is made possible.

The display device 100 has subpixels of red (R), green (G) and blue (B) arranged in a vertical stripe pattern. A pixel is made up of a red subpixel, a green subpixel and a blue subpixel (RGB).

In the array substrate 10, a plurality of pixel transistors (unshown) and gate lines 12 are formed on a glass substrate 11. The gate lines 12 extend in the X direction. The drain lines 13 are arranged over the gate lines 12 via an interlayer insulation film. The common electrodes 15 are arranged over the drain lines 13 via a planarization film 14 (see FIG. 6). Pixel electrodes 18 are arranged over the common electrodes 15 via an insulation layer 17. The common electrodes 15, extending in the direction parallel to the drain lines 13 (Y direction), are partitioned in the X direction and arranged periodically. Over the drain lines 13, auxiliary lines 16 are arranged in contact with the common electrodes 15. However, the auxiliary lines 16 are not arranged at the partitioning positions (partitioning regions) 19 of the common electrodes 15 in order to prevent a short circuit between the partitioned common electrodes 15. Each partitioning position 19 is situated over a drain of a subpixel of the specific color (e.g., blue subpixel). The drain lines 13 of the subpixels of the other colors (e.g., red subpixels and green subpixels) have no partitioning position 19 over them. Even at positions (over the drain lines 13 for the specific color) that are not the partitioning positions 19, the auxiliary line 16 over the drain line 13 is not arranged. The common electrodes 15 and the pixel electrodes 18 are formed of transparent conductor films such as ITO (Indium Tin Oxide). The gate lines 12, the drain lines 13 and the auxiliary lines 16 are formed of metal films such as Al alloy. The auxiliary lines 16 are arranged in order to reduce the resistance of the common electrodes 15.

The counter substrate 20 includes a black matrix (light blocking layer) 22 and RGB color filters (coloring layers) 23. The color filters 23 are arranged repeatedly in the row direction (X direction) in the order of R, G, B, R, G, . . . . Color filters 23 of the same color are arranged in the column direction (Y direction). Each color filter 23 is in a stripe shape (rectangular shape) in the plan view (length in the X direction < length in the Y direction).

Since the common electrodes 15 are used also as the touch panel scan electrodes Tx, adjustment of the write periods and the touch sensing periods is necessary. The relationship between the write periods and the touch sensing periods will be explained below by referring to FIGS. 7 and 8.

Figure 7:
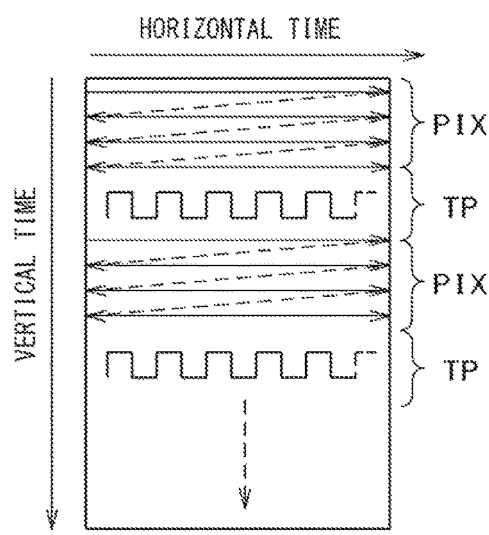
FIG. 7 is a schematic diagram for explaining write periods and touch sensing periods.
Figure 8:
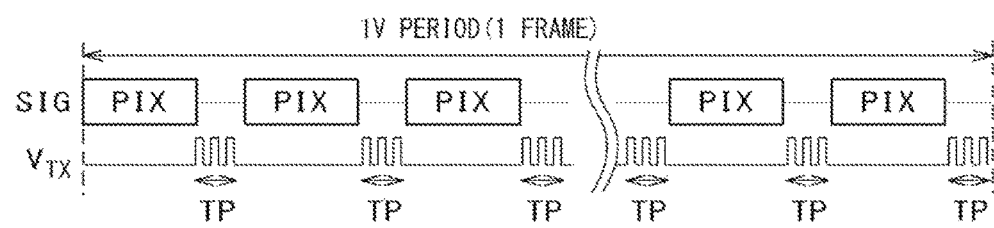
FIG. 8 is a schematic diagram for explaining the write periods and the touch sensing periods.

FIGS. 7 and 8 are schematic diagrams for explaining the write periods and the touch sensing periods.

One vertical period (1V PERIOD) or the display period of one frame is segmented into the write periods (PIXs) (periods for driving the video signals in the gate lines and the scan signals in the gate lines (SIG)) and the touch sensing periods (TPs) (periods for driving touch panel scan voltage ($V_{TX}$)) which are arranged alternately. This alternate driving is called "segmented V blank driving". The display period of one frame includes N write periods (PIXs) and N touch sensing periods (TPs). For example, 1280/N lines are scanned in each write period (PIX) and 20/M scan electrodes (common electrodes) are scanned in each touch sensing period (TP). In a case where N=20 and M=20, for example, 64 lines are scanned in each write period (PIX) and one scan electrode is scanned in each touch sensing period (TP). The touch panel scan voltage ($V_{TX}$) is applied to each scan electrode 20-40 times. Here, M is a natural number. The number M can be greater or less than N or equal to N. When the number of times of the touch sensing in each vertical period should be set large (e.g., 4 times), the numbers N and M can be set at 20 and 5 (N=20, M=5). This setting allows every common electrode to perform the touch sensing four times in each vertical period, by which the accuracy of the touch sensing is increased. When the number of times of the touch sensing in each vertical period should be set small (e.g., ½ times per vertical period, that is, once in two vertical periods), the numbers N and M can be set at 20 and 40 (N=20, M=40). With this setting, every common electrode performs the touch sensing once in two vertical periods, by which the power consumption for the touch sensing is reduced. The values of N and M are determined by setting values in a storage circuit (e.g., register) of the driver IC 4 from the controller 3.

The column inversion driving performed by the display device 100 will be explained below by referring to FIG. 9.

Figure 9:
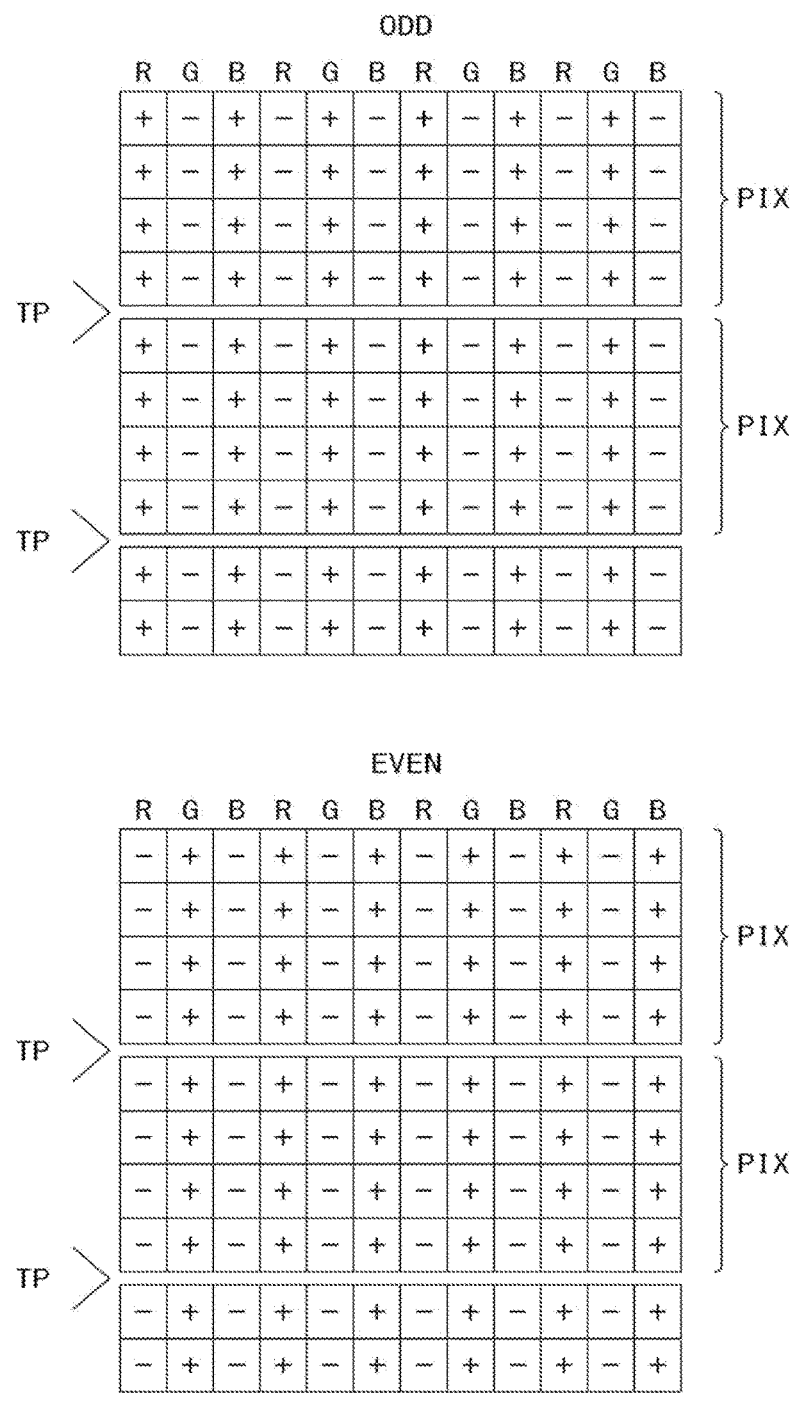

FIG. 9 is a schematic diagram for explaining the column inversion driving. In FIG. 9, the upper diagram indicates the polarity of an odd-numbered frame (ODD), while the lower diagram indicates the polarity of an even-numbered frame (EVEN).

As shown in FIG. 9, the column inversion driving is a driving method in which the signal polarity of drain lines is inverted between adjacent drain lines and the signal polarity is also inverted every frame (inverted between odd-numbered frames and even-numbered frames). The signal in each drain line remains in the same polarity during each frame. In FIG. 9, the symbol + indicates that the signal in the drain line is in the positive polarity, the symbol − indicates that the signal in the drain line is in the negative polarity, the character R represents a red subpixel and a drain line for writing into the red subpixel, the character G represents a green subpixel and a drain line for writing into the green subpixel, and the character B represents a blue subpixel and a drain line for writing into the blue subpixel (ditto for FIGS. 10-14). Incidentally, each touch sensing period (TP) exists between adjacent write periods (PIXs).

Since the partitioning regions 19 of the common electrodes 15 exist over drain lines 13 of blue subpixels as shown in FIG. 6, electric field leakage CT from such drain lines 13 occurs. In other words, if a partitioning region 19 exists over a drain line 13, a leakage electric field from the drain line 13 exerts an influence on pixel electrodes 18 through the partitioning region 19 of the common electrodes 15. The influence of the leakage electric field is strong since the signal polarity necessarily differs between adjacent drain lines in the column inversion driving. While the influence of the leakage electric field can be reduced by dot-inverting the signal polarity of the drain lines of the blue subpixels, the power consumption increases instead. In consideration of color mixture, the partitioning regions 19 of the common electrodes 15 are desired to be arranged over drain lines of blue subpixels. However, the display device of this example is not restricted to such arrangement.

Next, the outline of the driving method according to the example will be explained below by referring to FIG. 10.

Figure 10:
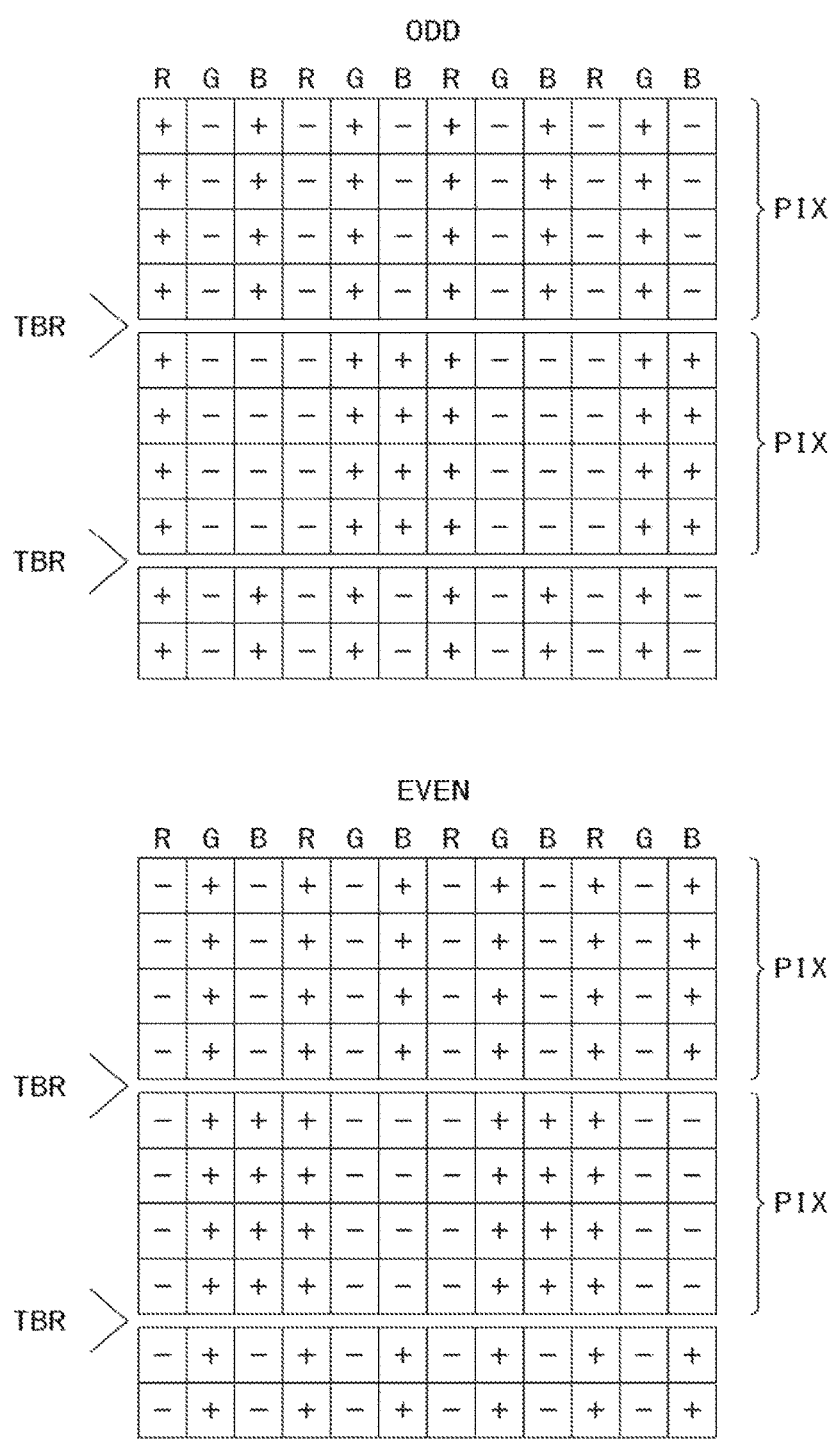

FIG. 10 is a schematic diagram for explaining the driving method according to the example. In FIG. 10, the upper diagram indicates the polarity of an odd-numbered frame (ODD), while the lower diagram indicates the polarity of an even-numbered frame (EVEN).

In the driving method according to the example, the signal polarity of the drain lines of the red subpixels and the signal polarity of the drain lines of the green subpixels are inverted by means of the column inversion, while the signal polarity of the drain lines of the blue subpixels is inverted every touch sensing period (TP). Such signal polarity inversion (signal polarity reversal) of drain lines conducted every touch sensing period (TP) will be referred to as "TBR" as needed. Since one frame includes the write periods (PIXs) and the touch sensing periods (TPs) arranged alternately, the signal polarity of the drain lines of the blue subpixels is inverted every write period. The polarity is also inverted between odd-numbered frames and even-numbered frames. It is assumed here that the frame frequency is 60 Hz and the drive frequency of the touch panel scan electrodes is 60 Hz (hereinafter referred to as "60 Hz driving"). Thus, the touch panel scan electrodes are driven once in each frame. For example, if there are twenty touch panel scan electrodes, twenty scan electrodes are driven in each frame. If the drive frequency of the touch panel scan electrodes is set at 120 Hz (hereinafter referred to as "120 Hz driving"), the touch panel scan electrodes are driven twice in each frame, that is, forty touch panel scan electrodes are driven in each frame. The length of the write period (PIX) in the 120 Hz driving ($T_{P120}$) is ½ of the length of the write period (PIX) in the 60 Hz driving ($T_{P60}$). The number of gate lines driven in each write period in the 120 Hz driving is also ½ of that in the 60 Hz driving. Incidentally, the length of the touch sensing period (TP) in the 120 Hz driving ($T_{T120}$) is assumed to be equal to the length of the touch sensing period (TP) in the 60 Hz driving ($T_{T60}$).

Comparative Example 1

A technology (comparative example 1) that was examined prior to the present disclosure will be explained below by referring to FIG. 11.

Figure 11:
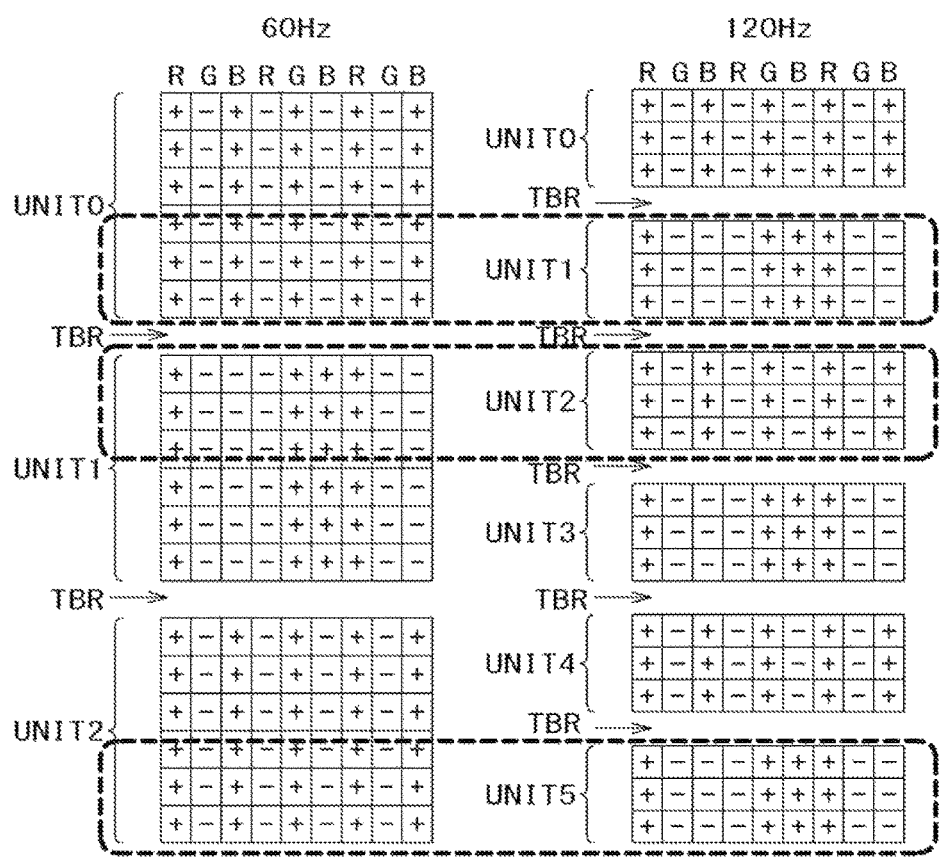
FIG. 11 is a schematic diagram for explaining a display device driving method according to a comparative example 1.

FIG. 11 is a schematic diagram for explaining a display device driving method according to the comparative example 1.

In order to avoid the AC charger noise, the touch sensing is performed by switching the driving method between the 60 Hz driving and the 120 Hz driving. If the signal polarity of the drain lines of the blue subpixels is inverted every write period (PIX) in this case, UNIT 1, UNIT 2 and UNIT 5 in the 120 Hz driving shown in FIG. 11 include parts where the signal polarity of the drain lines of the blue subpixels differs from that in the 60 Hz driving and are recognized as block unevenness. Each UNIT corresponds to a write period (PIX). Specifically, UNIT 0 is a first write period (PIX) in a frame and UNIT 1 is the next write period (PIX). Thereafter, write periods (PIXs) UNIT 2, UNIT 3, UNIT 4, UNIT 5, ... follow.

Next a display device driving method according to an example of the present disclosure will be explained below by referring to FIGS. 12-13B.

Figure 12:
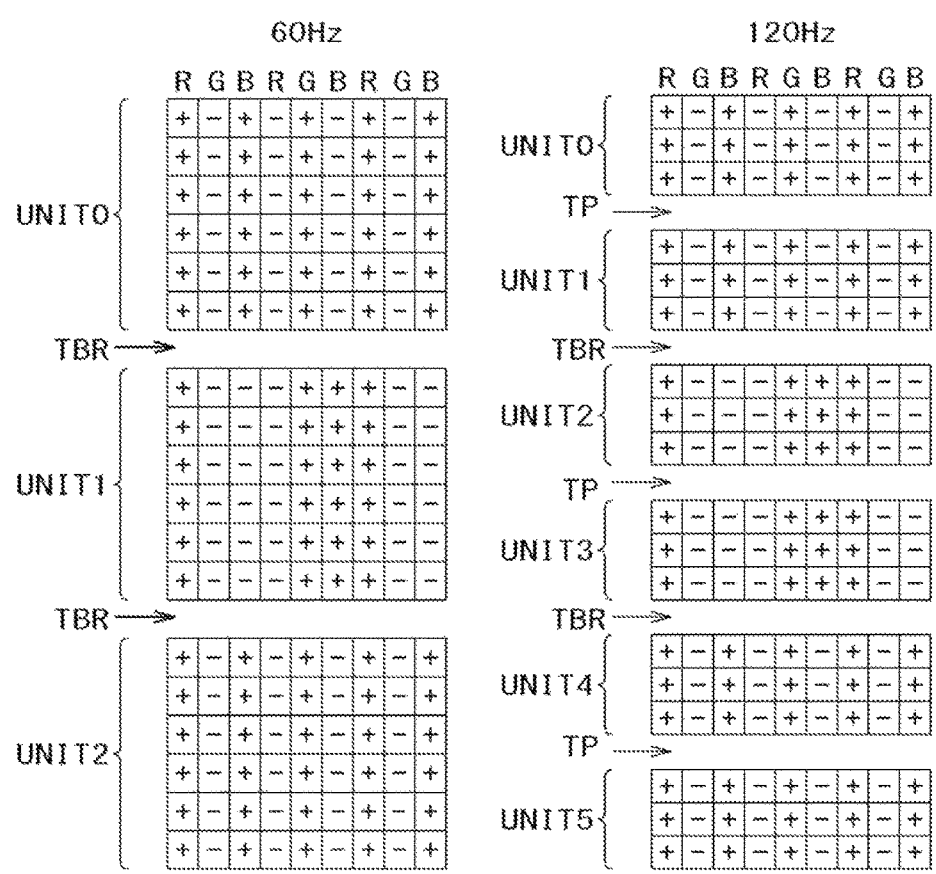
FIG. 12 is a schematic diagram for explaining a display device driving method according to the example.
Figure 13A:
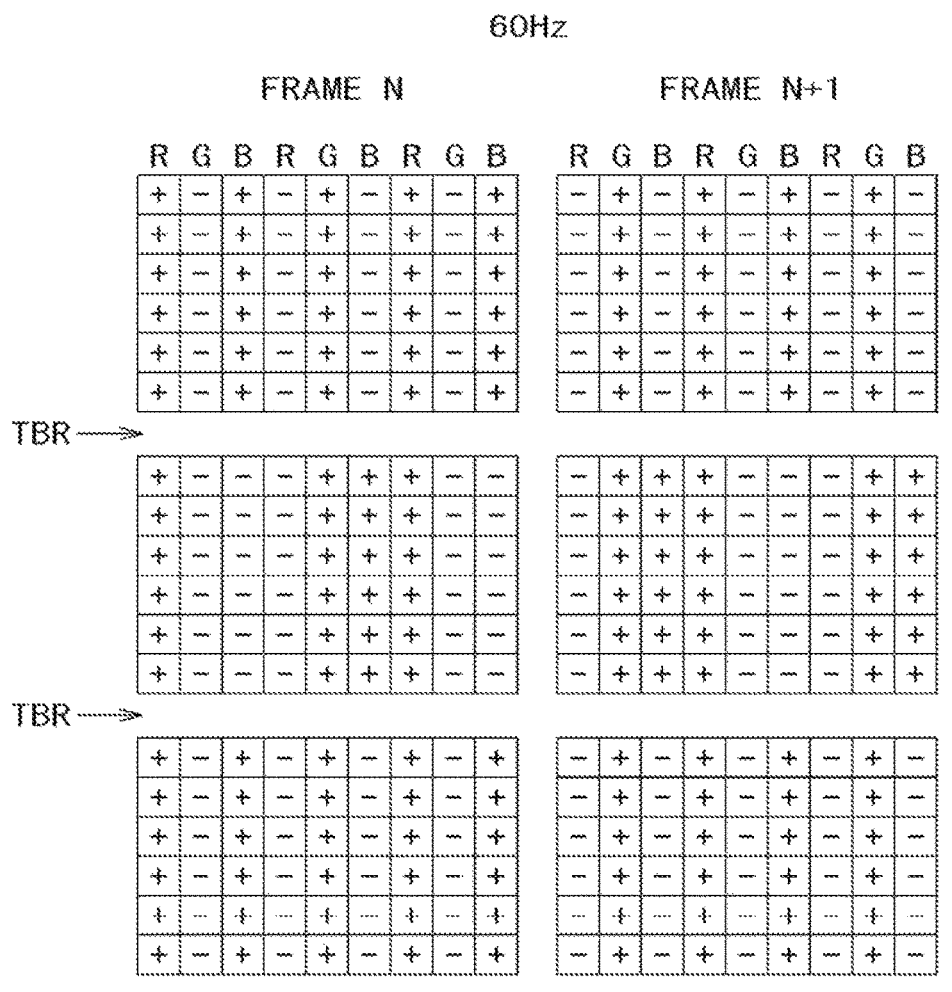

FIG. 12 is a schematic diagram for explaining the display device driving method according to the example. FIGS. 13A and 13B are schematic diagrams for explaining the relationship between frames in the display device driving method according to the example.

In the display device of the example, every how many UNITs the signal polarity of the drain lines of the blue subpixels should be inverted (the number of UNITs representing the unit of the signal polarity inversion) can be changed flexibly by making a setting to the storage circuit of the driver IC 4. For example, as shown in FIG. 12, the signal polarity of the drain lines of the blue subpixels is inverted every UNIT in the 60 Hz driving and every two UNITs in the 120 Hz driving. In other words, the TBR in the 60 Hz driving occurs every touch sensing period (TP), whereas the TBR in the 120 Hz driving occurs every other touch sensing period (TP). Put another way, when the display device is configured to be able to drive the scan electrodes at a cycle of 1 frame or 0.5 frames, the following setting is made: When the scan electrodes are driven at the cycle of 1 frame, the signal polarity of the drain lines of the blue subpixels is inverted every write period. When the scan electrodes are driven at the cycle of 0.5 frames, the signal polarity of the drain lines of the blue subpixels is inverted every two write periods.

When the display device is configured to be able to drive the scan electrodes at frequencies of m (Hz) and k×m (Hz) (k: natural number), the following setting is made: When the scan electrodes are driven at the frequency of m (Hz), the signal polarity of the drain lines of the blue subpixels is inverted every write period. When the scan electrodes are driven at the frequency of k×m (Hz), the signal polarity of the drain lines of the blue subpixels is inverted every k write periods.

Figure 13B:
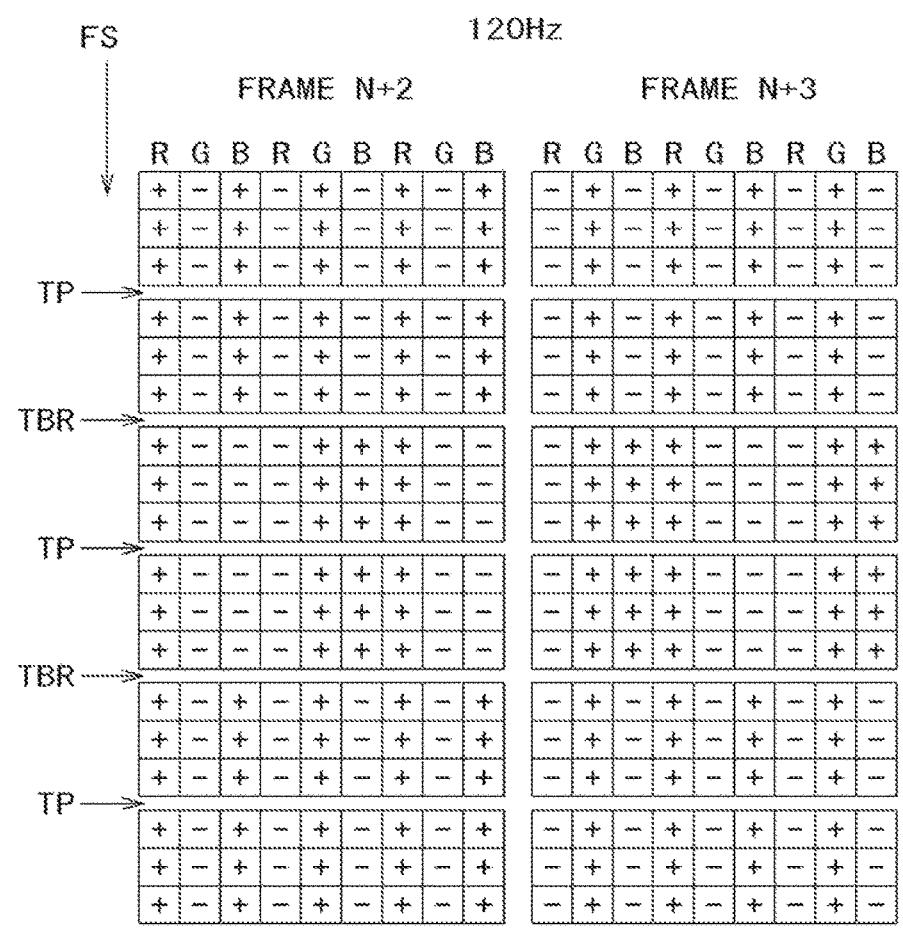
FIG. 13B is a schematic diagram for explaining the relationship between frames in the display device driving method according to the example.

As shown in FIG. 13A, the frame N and the frame N+1 are driven by the 60 Hz driving. Thereafter, the drive frequency is switched to 120 Hz between the frame N+1 and the frame N+2 (FS) as shown in FIG. 13B and the frame N+2 and the frame N+3 are driven by the 120 Hz driving. The frame N is the same as the frame on the left side of FIG. 12 (60 Hz driving), while the frame N+1 has inverted polarity. The frame N+2 is the same as the frame on the right side of FIG. 12 (120 Hz driving), while the frame N+3 has inverted polarity.

With this driving method, the signal polarity of the drain lines of the blue subpixels becomes totally the same between the 120 Hz driving and the 60 Hz driving, by which the recognition of block unevenness (problem in the comparative example 1) is eliminated.

Modification 1

A modification of the above display device driving method according to the example (modification 1) will be explained below by referring to FIG. 14.

Figure 14:
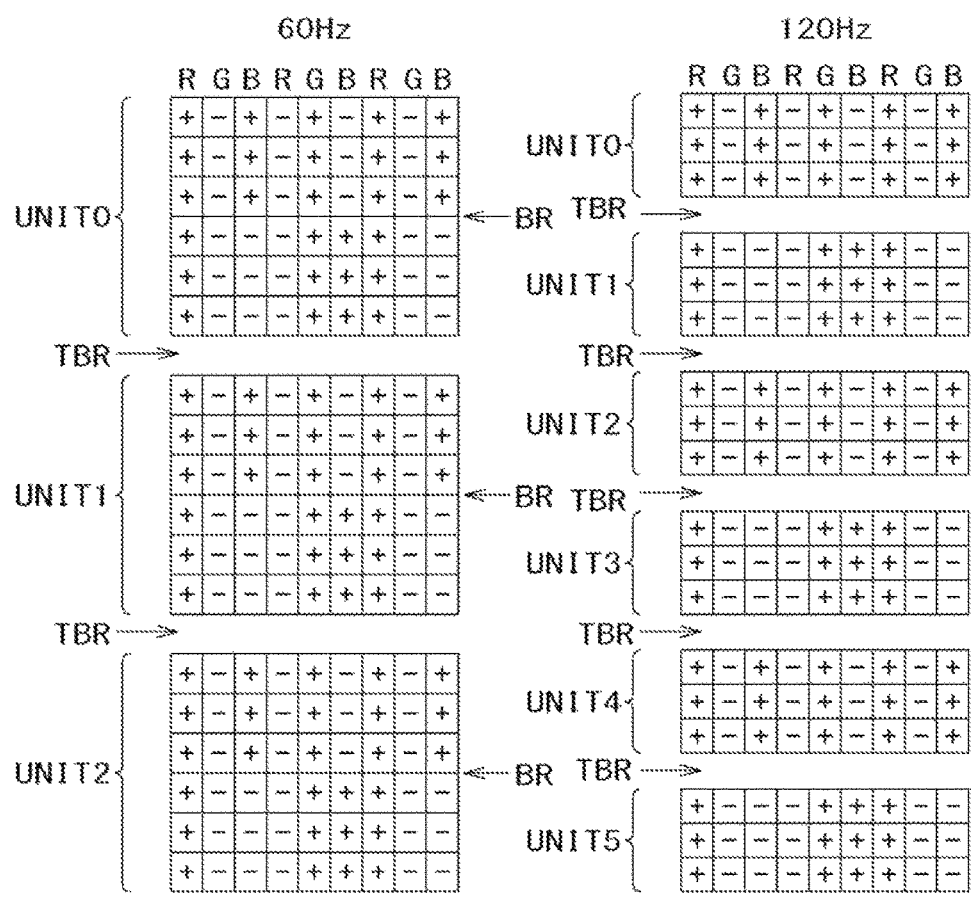
FIG. 14 is a schematic diagram for explaining a display device driving method according to a modification 1.

FIG. 14 is a schematic diagram for explaining a display device driving method according to the modification 1.

As shown in FIG. 14, in the display device driving method according to the modification 1, the signal polarity of the drain lines of the blue subpixels is inverted every 0.5 UNITs in the 60 Hz driving and every UNIT in the 120 Hz driving. Put another way, when the display device is configured to be able to drive the scan electrodes at a cycle of 1 frame or 0.5 frames, the following setting is made: When the scan electrodes are driven at the cycle of 1 frame, the signal polarity of the drain lines of the blue subpixels is inverted every 0.5 write periods. When the scan electrodes are driven at the cycle of 0.5 frames, the signal polarity of the drain lines of the blue subpixels is inverted every write period.

When the display device is configured to be able to drive the scan electrodes at frequencies of m (Hz) and k×m (Hz) (k: natural number), the following setting is made: When the scan electrodes are driven at the frequency of m (Hz), the signal polarity of the drain lines of the blue subpixels is inverted every 1/k write periods. When the scan electrodes are driven at the frequency of k×m (Hz), the signal polarity of the drain lines of the blue subpixels is inverted every write period.

Also with this driving method, the signal polarity of the drain lines of the blue subpixels becomes totally the same between the 120 Hz driving and the 60 Hz driving, by which the recognition of block unevenness (problem in the comparative example 1) is eliminated.

The display device driving method according to the example and the display device driving method according to the comparative example 1 are implemented by setting values in a storage circuit (register, memory, etc.) of the driver IC 4 (drive circuit) from the controller 3. By the setting, the cycle of the signal polarity inversion of the drain lines of the blue subpixels is determined. By the display device driving method according to the example and the display device driving method according to the comparative example 1, the influence of the electric field leakage from the drain lines of the blue subpixels can be reduced. Since the common electrodes (touch panel scan electrodes) 15 can be arranged to extend in the Y direction, the common electrodes 15 are connected to the drain lines 13 while maintaining the output of the driver IC 4 in the high-impedance (Hi-z) state, by which the driving of the scan electrodes 15 can be assisted also from the drain lines 13 while ignoring the capacitance between the touch panel scan electrodes 15 and the drain lines 13. Consequently, the speeding up of the writing to the scan electrodes 15 is made possible. In order to enlarge the screen size of the display panel, the number of the touch panel scan electrodes has to be increased. In cases of vertically long display panels, the increase in the number of the touch panel scan electrodes (due to the enlargement of the screen size) can be suppressed more if the touch panel scan electrodes extend in the Y direction rather than in the X direction. Since the scan period per touch panel scan electrode can be made longer, the touch sensing accuracy can be increased.

Incidentally, while the signal polarity of the drain lines of the blue subpixels is inverted at a cycle shorter than one frame in the above explanation, the display device according to this embodiment is not restricted to such settings. For example, in cases where the partitioning regions 19 of the common electrodes 15 exist over drain lines of red subpixels, the signal polarity of the drain lines of the red subpixels may be inverted at a cycle shorter than one frame. In cases where the partitioning regions 19 of the common electrodes 15 exist over drain lines of green subpixels, the signal polarity of the drain lines of the green subpixels may be inverted at a cycle shorter than one frame.

Gate Line Bidirectional Scan

Figure 17:
FIG. 17 is a schematic diagram for explaining a reverse scan of the display device according to the example.

A gate line bidirectional scan will be explained below by referring to FIGS. 15-17.

FIG. 15 is a schematic diagram for explaining a forward scan of the display device according to the example. FIG. 16 is a schematic diagram for explaining a reverse scan of a display device according to a comparative example 2. FIG. 17 is a schematic diagram for explaining a reverse scan of the display device according to the example.

There are two directions of scanning the gate lines: the forward scan successively scanning the gate lines from top to bottom of the screen and the reverse scan successively scanning the gate lines from bottom to top of the screen.

Assuming that there are 2560 lines (gate lines) and 106 touch panel scan electrodes, for example, 24 gate lines are driven in the first write period (UNIT 0) and then one touch panel scan electrode is driven. Thereafter, 24 gate lines are driven in each write period (UNIT 1-UNIT 105) while driving touch panel scan electrodes one by one in 105 touch sensing periods. After driving 2544 gate lines and 106 touch panel scan electrodes, 16 gate lines are driven. The number of gate lines driven in INVALID differs from the number of gate lines driven in each of UNIT 0-UNIT 105. The driving at times of the forward scan is performed as shown in FIG. 15. After the polarity is inverted at the switching from the forward scan to the reverse scan (switching of the frame), the driving is performed as shown in FIG. 16. Since the number of lines of INVALID in the forward scan (16 lines) and the number of lines of UNIT 0 in the reverse scan (24 lines) differ from each other, there exist lines in which the signal polarity of the drain lines of the blue subpixels does not invert and such lines are recognized as horizontal stripes.

To avoid this problem, the display device is configured so that the number of lines of UNIT 0 in the reverse scan can be set properly in the vertical inversion. For example, by setting the number of lines of UNIT 0 in the reverse scan at 16 as shown in FIG. 17, the difference (deviation) in the number of lines at the vertical inversion can be eliminated and the signal polarity of the drain lines of the blue subpixels is allowed to invert in all lines at the time of vertical inversion, by which the horizontal stripes are prevented.

The number of lines of UNIT 0 in the reverse scan is determined by setting a value in a storage circuit (register, memory, etc.) of the driver IC 4 (drive circuit).

Signal Line Selection Circuit

Figure 19:
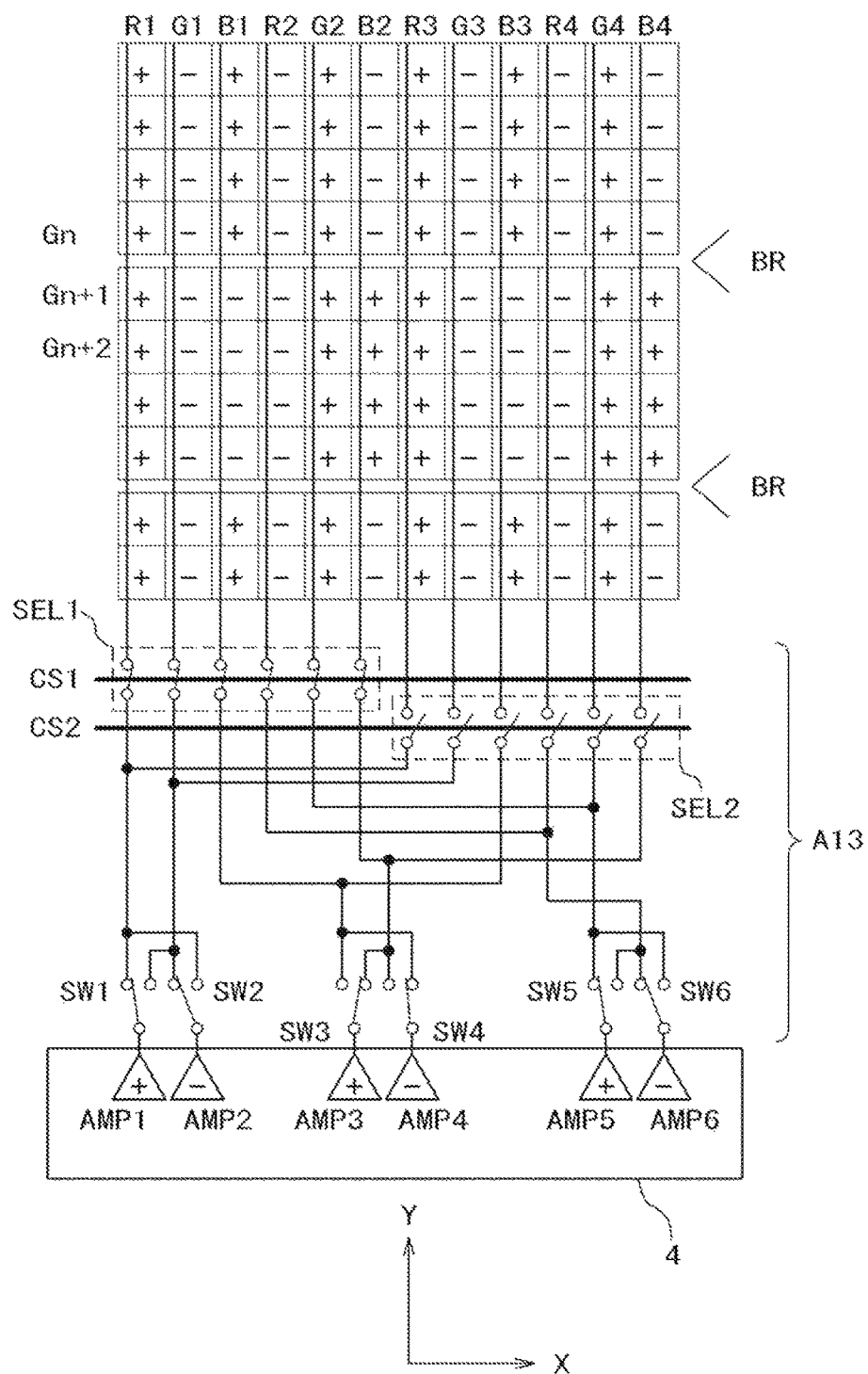
FIG. 19 is a block diagram for explaining the signal line selection circuit of the display device according to the example.
Figure 20:
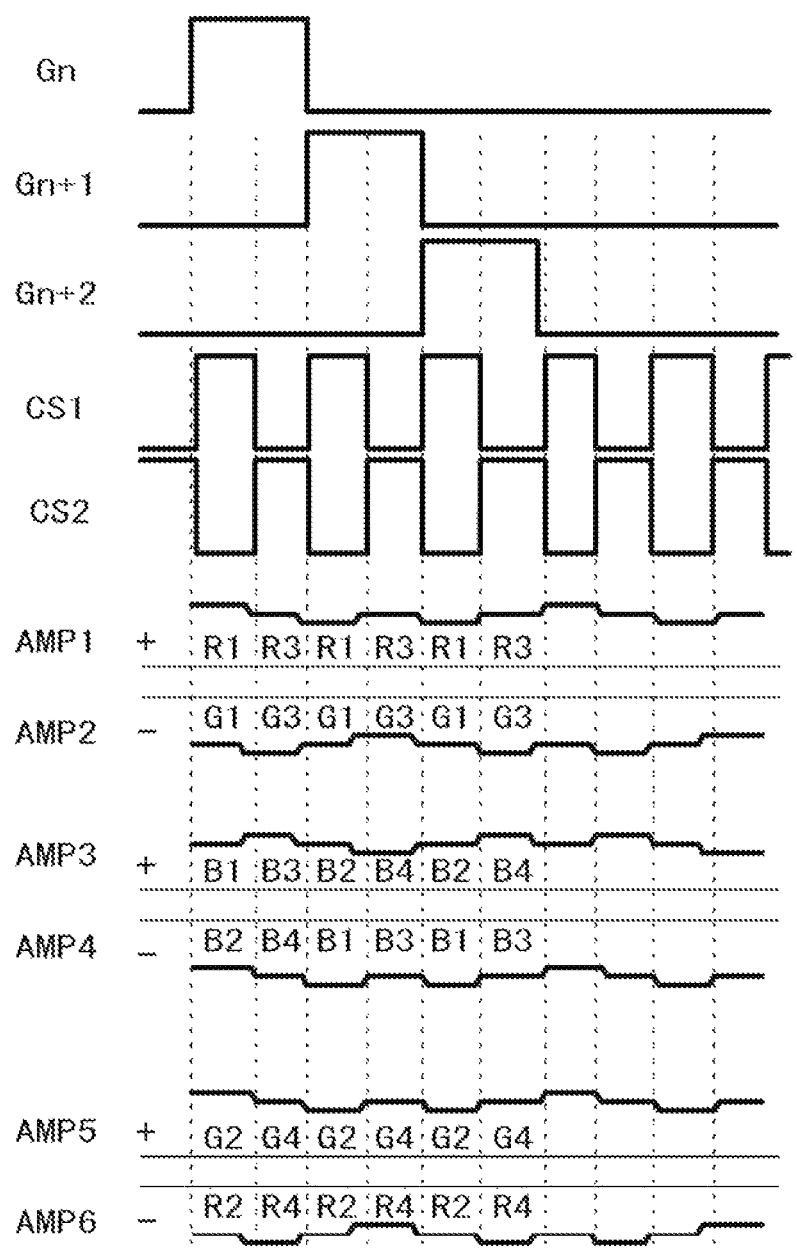
FIG. 20 is a timing chart for explaining the signal line selection circuit of the display device according to the example.

An example of the configuration of the signal line selection circuit A13 will be explained below by referring to FIGS. 18-20.

Figure 18:
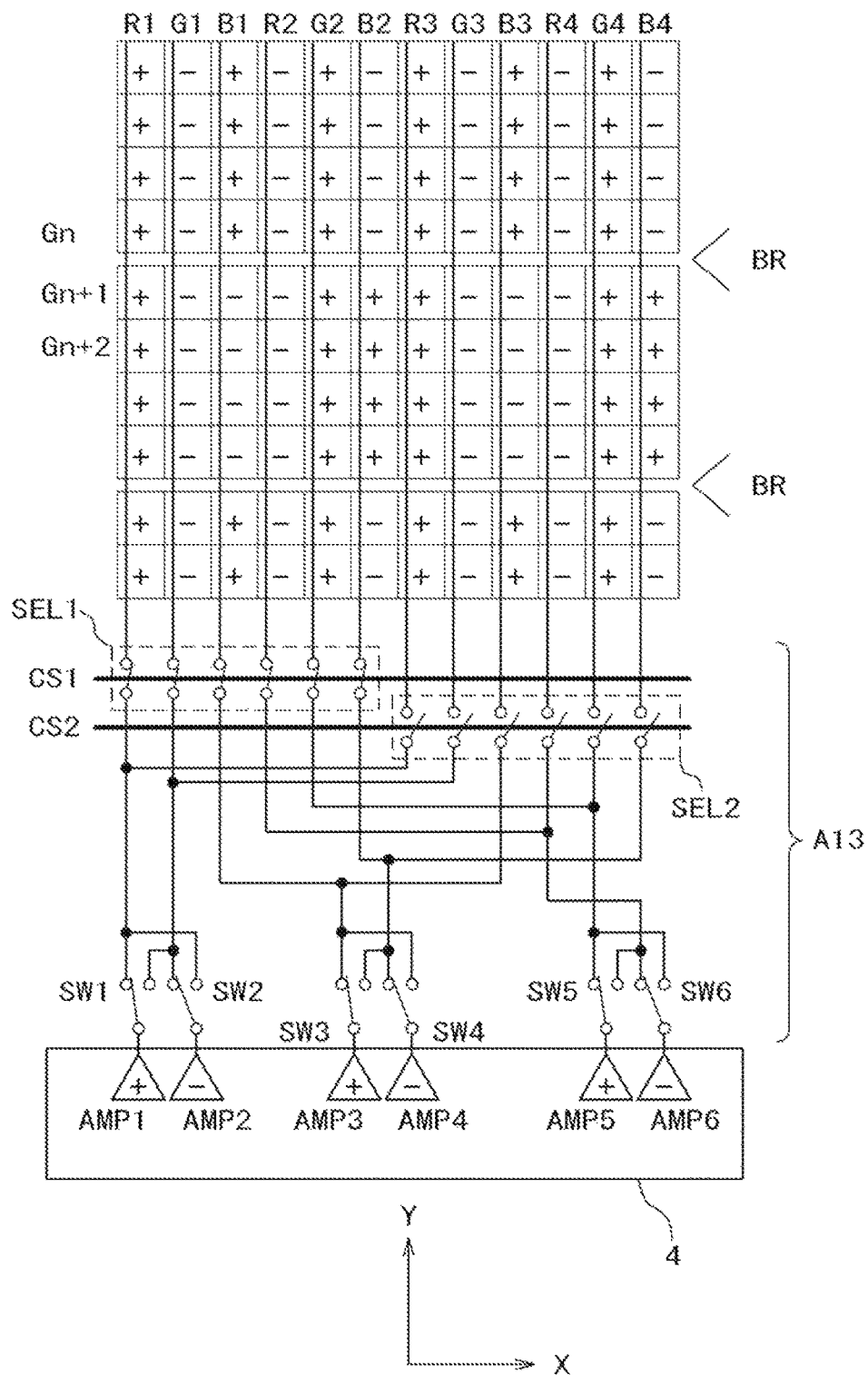
FIG. 18 is a block diagram for explaining a signal line selection circuit of the display device according to the example.

FIG. 18 is a block diagram for explaining the signal line selection circuit (before the polarity switching) of the display device according to the example. FIG. 19 is a block diagram for explaining the signal line selection circuit (after the polarity switching) of the display device according to the example. FIG. 20 is a timing chart for explaining the signal line selection circuit of the display device according to the example. FIG. 18 shows a case where a gate line Gn is driven, while FIG. 19 shows a case where gate lines Gn+1 and Gn+2 are driven. In FIGS. 18-20, the symbol + indicates that the signal in the drain line is in the positive polarity, the symbol − indicates that the signal in the drain line is in the negative polarity, the characters R1, R2, R3, . . . represent red subpixels and drain lines for writing into the red subpixels, the characters G1, G2, G3, . . . represent green subpixels and drain lines for writing into the green subpixels, and the characters B1, B2, B3, . . . represent blue subpixels and drain lines for writing into the blue subpixels (ditto for FIGS. 21 and 22).

The driver IC 4 is formed by arranging a positive polarity amplifier AMP1 and a negative polarity amplifier AMP2, a positive polarity amplifier AMP3 and a negative polarity amplifier AMP4, a positive polarity amplifier AMP5 and a negative polarity amplifier AMP6, and so forth. The signal line selection circuit A13 includes distribution switches SEL1 and SEL2 for dividing each horizontal period into two periods and positive/negative selector switches SW1, SW2, SW3, SW4, SW5 and SW6. The distribution switches SEL1 and SEL2 are ON/OFF controlled by a first control signal CS1 and a second control signal CS2, respectively. The distribution switch SEL1/SEL2 is ON when the first/second control signal CS1/CS2 is at a high level and OFF when the first/second control signal CS1/CS2 is at a low level. The driver IC 4 outputs the first and second control signals CS1 and CS2 and control signals for the positive/negative selector switches SW1, SW2, SW3, SW4, SW5 and SW6. The driver IC 4 and the signal line selection circuit A13 can be collectively referred to as a drive circuit.

In order to have drain lines (subpixels) of positive and negative polarities alternately arranged on the gate line Gn and have drain lines (subpixels) of polarities +, −, −, −, +, +, +, −, −, −, +, +, . . . arranged from left to right on the gate line Gn+1, the following connections are made: First, since the polarities of the drain lines R and G do not change between the gate line Gn and the gate line Gn+1, the drain line R1 and the drain line G1 are connected to the positive polarity amplifier AMP1 and the negative polarity amplifier AMP2, respectively, and the drain line R2 and the drain line G2 are connected to the negative polarity amplifier AMP6 and the positive polarity amplifier AMP5, respectively. As shown in FIGS. 18 and 19, the connections of the positive/negative selector switches SW1, SW2, SW5 and SW6 are not switched between the gate line Gn and the gate line Gn+1.

Since the polarity of the drain lines B is inverted between the gate line Gn and the gate line Gn+1, the drain lines B1 and B3 are connected to the positive polarity amplifier AMP3 and the drain lines B2 and B4 are connected to the negative polarity amplifier AMP4 at the gate line Gn as shown in FIG. 18. The positive/negative selector switches SW3 and SW4 are switched as shown in FIG. 19, by which the drain lines B1 and B3 are connected to the negative polarity amplifier AMP4 and the drain lines B2 and B4 are connected to the positive polarity amplifier AMP3 at the gate line Gn+1.

Incidentally, when the polarity is inverted for the inversion driving in units of frames, the connections of the positive polarity amplifiers AMP1, AMP3, AMP5, . . . and the negative polarity amplifiers AMP2, AMP4, AMP6, . . . are switched by using all the positive/negative selector switches SW1, SW2, SW3, SW4, SW5, SW6, . . . .

Modification 2

In the case where the writing is performed in the order of the distribution switch SEL1 and the distribution switch SEL2, the signal electric potential of each drain line that has undergone the writing through the distribution switch SEL1 fluctuates due to the coupling when the writing is performed through the distribution switch SEL2. On the drain lines B2 and B4, unevenness occurs in units of blocks since the adjacent drain lines R3 and R5 (unshown) are switched to reverse polarities by the distribution switches SEL1 and SEL2.

Therefore, a configuration in which the drain lines adjacent to the drain lines B2 and B4 are not switched to reverse polarities by the distribution switches SEL1 and SEL2 (modification of the signal line selection circuit A13 (modification 2)) will be explained below by referring to FIGS. 21-23.

Figure 21:
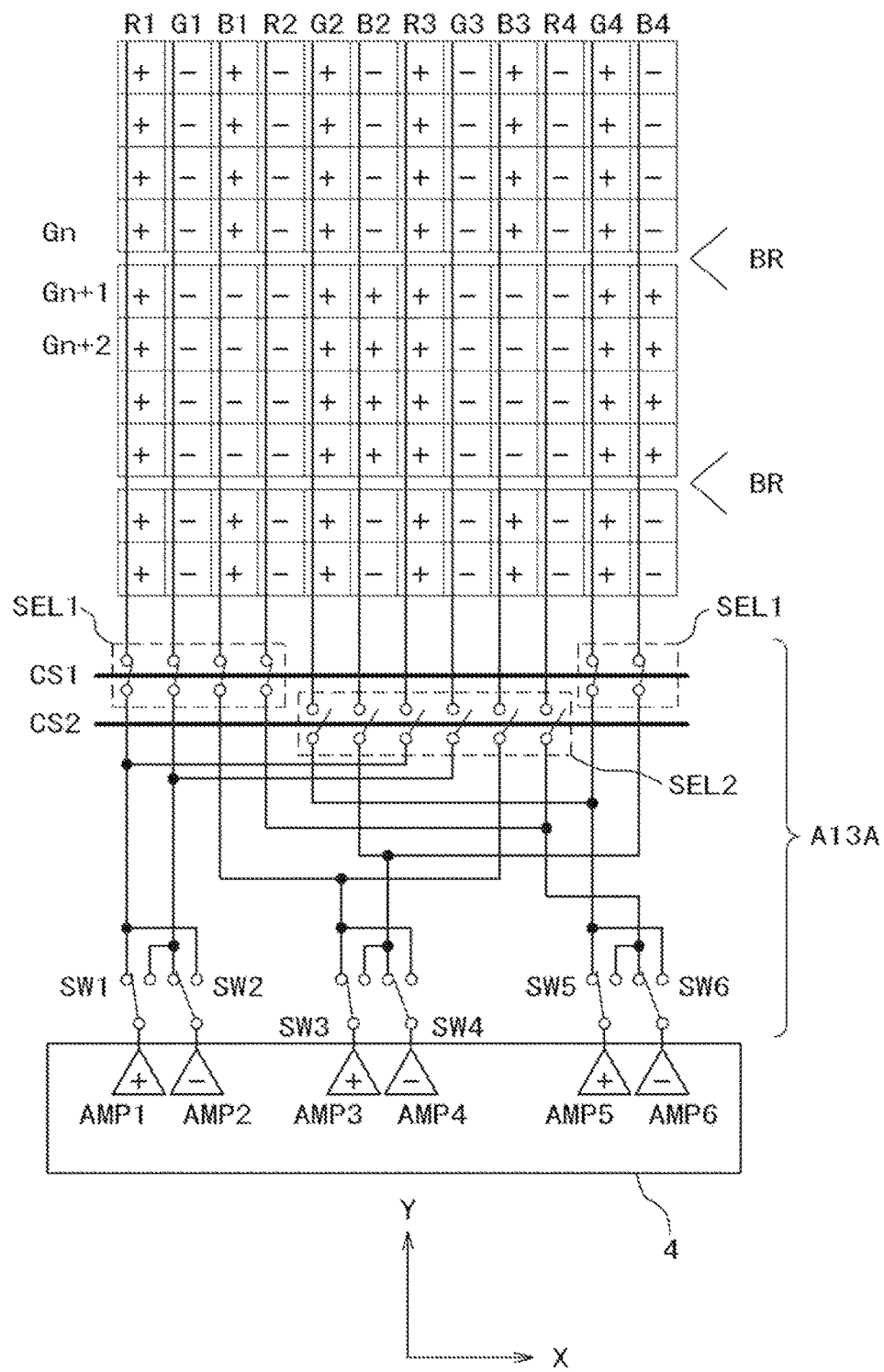
FIG. 21 is a block diagram for explaining a signal line selection circuit of a display device according to a modification 2.

FIG. 21 is a block diagram for explaining a signal line selection circuit (before polarity switching) of a display device according to the modification 2. FIG. 22 is a block diagram for explaining the signal line selection circuit (after polarity switching) of the display device according to the modification 2. FIG. 23 is a timing chart for explaining the signal line selection circuit of the display device according to the modification 2. FIG. 21 shows a case where the gate line Gn is driven, while FIG. 22 shows a case where the gate lines Gn+1 and Gn+2 are driven.

The driver IC 4 is formed by arranging a positive polarity amplifier AMP1 and a negative polarity amplifier AMP2, a positive polarity amplifier AMP3 and a negative polarity amplifier AMP4, a positive polarity amplifier AMP5 and a negative polarity amplifier AMP6, and so forth. The signal line selection circuit A13A includes distribution switches SEL1 and SEL2 for dividing each horizontal period into two periods and positive/negative selector switches SW1, SW2, SW3, SW4, SW5 and SW6. The distribution switches SEL1 and SEL2 are ON/OFF controlled by a first control signal CS1 and a second control signal CS2, respectively. The distribution switch SEL1/SEL2 is ON when the first/second control signal CS1/CS2 is at a high level and OFF when the first/second control signal CS1/CS2 is at a low level. The driver IC 4 and the signal line selection circuit A13A can be collectively referred to as a drive circuit.

As shown in FIG. 21, the drain line B4 is connected to the negative polarity amplifier AMP4 by the distribution switch SEL1, the drain line B2 is connected to the negative polarity amplifier AMP4 by the distribution switch SEL2, the drain line G4 is connected to the positive polarity amplifier AMP5 by the distribution switch SEL1, and the drain line G2 is connected to the positive polarity amplifier AMP5 by the distribution switch SEL2. The drain line R5 is connected to a positive polarity amplifier AMP7 (unshown) by the distribution switch SEL1, and the drain line R3 is connected to the positive polarity amplifier AMP1 by the distribution switch SEL2. Since signals are supplied to the drain lines B4, G4 and R5 through the distribution switch SEL1 and signals are supplied to the drain lines B2, G2 and R3 through the distribution switch SEL2, the signals in the drain lines adjacent to the drain lines B2 and B4 do not change due to the distribution switches SEL1 and SEL2.

Figure 22:
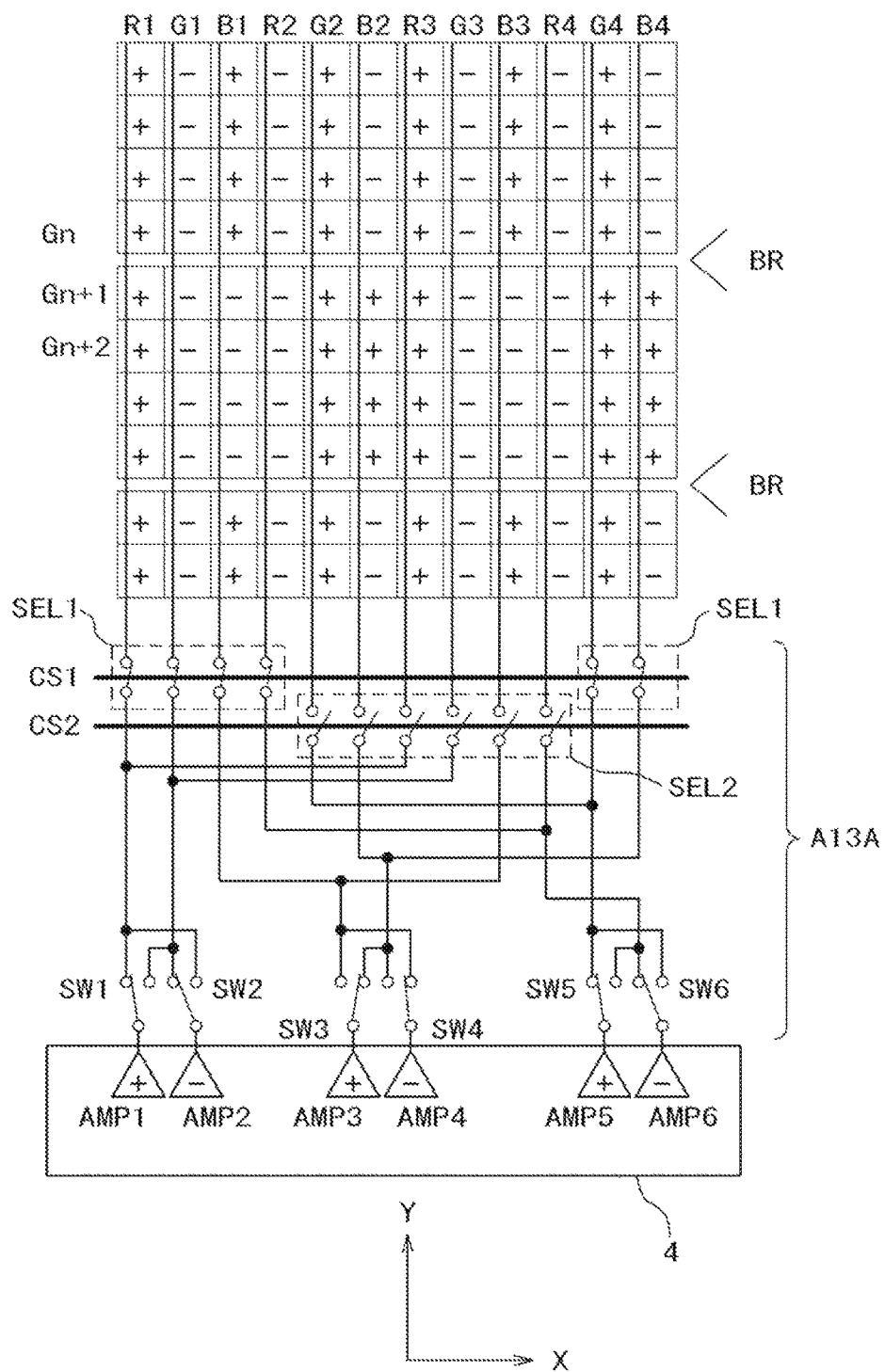
FIG. 22 is a block diagram for explaining the signal line selection circuit of the display device according to the modification 2.
Figure 23:
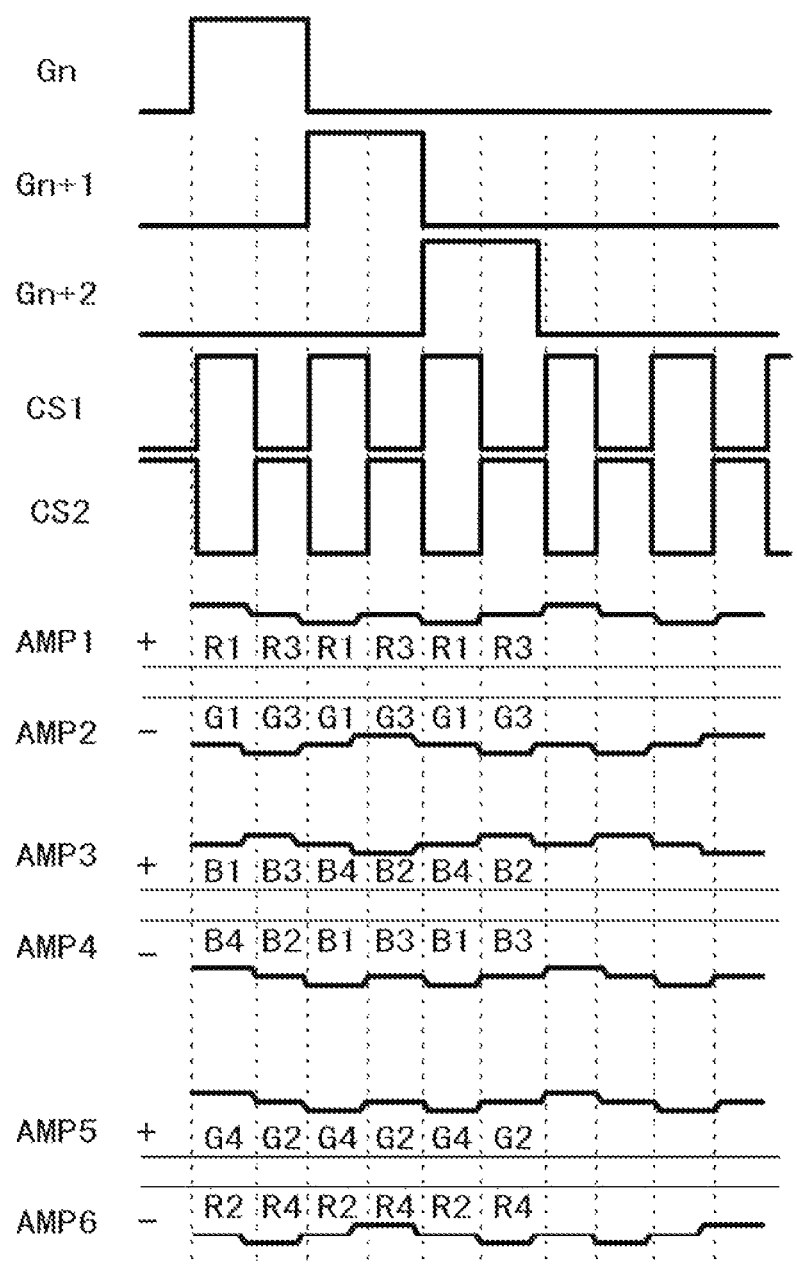
FIG. 23 is a timing chart for explaining the signal line selection circuit of the display device according to the modification 2.

As shown in FIG. 22, the drain line B4 is connected to the positive polarity amplifier AMP3 by the distribution switch SEL1, the drain line B2 is connected to the positive polarity amplifier AMP3 by the distribution switch SEL2, the drain line G4 is connected to the positive polarity amplifier AMP5 by the distribution switch SEL1, and the drain line G2 is connected to the positive polarity amplifier AMP5 by the distribution switch SEL2. The drain line R5 is connected to a positive polarity amplifier AMP7 (unshown) by the distribution switch SEL1, and the drain line R3 is connected to the positive polarity amplifier AMP1 by the distribution switch SEL2. Since signals are supplied to the drain lines B4, G4 and R5 through the distribution switch SEL1 and signals are supplied to the drain lines B2, G2 and R3 through the distribution switch SEL2, the signals in the drain lines adjacent to the drain lines B2 and B4 do not change due to the distribution switches SEL1 and SEL2.

Incidentally, when the polarity is inverted for the inversion driving in units of frames, the connections of the positive polarity amplifiers AMP1, AMP3, AMP5, . . . and the negative polarity amplifiers AMP2, AMP4, AMP6, . . . are switched by using all the positive/negative selector switches SW1, SW2, SW3, SW4, SW5, SW6, . . . .

What is claimed is:

1. A display device comprising an array substrate, a counter substrate and a drive circuit, wherein:
    the array substrate includes gate lines extending in a first direction, drain lines extending in a second direction different from the first direction, and common electrodes extending in the second direction, and
    the counter substrate includes sensing electrodes extending in the first direction, and
    the common electrodes are configured to be partitioned over drain lines of pixels of a specific color and to be used also as touch panel scan electrodes, and
    the drive circuit is configured so that:
        write periods for driving the gate lines and touch sensing periods for driving the scan electrodes are alternately repeated in each frame period, and
        signal polarity of drain lines for colors other than the specific color is inverted every frame, and
        signal polarity of drain lines for the specific color is inverted at a cycle shorter than one frame, and
        the cycle of the signal polarity inversion of the drain lines for the specific color can be changed.

2. The display device according to claim 1, wherein the drive circuit is configured so that the signal polarity of the drain lines for the specific color is inverted every n write periods.

3. The display device according to claim 1, wherein the drive circuit is configured so that:
    the scan electrodes can be driven at frequencies of m Hz and k×m Hz, and
    the signal polarity of the drain lines for the specific color is inverted every write period when the scan electrodes are driven at the frequency of m Hz, and
    the signal polarity of the drain lines for the specific color is inverted every k write periods when the scan electrodes are driven at the frequency of k×m Hz.

4. The display device according to claim 3, wherein the drive circuit is configured so that:

the scan electrodes can be driven at frequencies of 60 Hz and 120 Hz, and the signal polarity of the drain lines for the specific color is inverted every write period when the scan electrodes are driven at the frequency of 60 Hz, and the signal polarity of the drain lines for the specific color is inverted every two write periods when the scan electrodes are driven at the frequency of 120 Hz.

5. The display device according to claim 1, wherein the drive circuit is configured so that:

the scan electrodes can be driven at a cycle of one frame and at a cycle of 0.5 frames, and the signal polarity of the drain lines for the specific color is inverted every write period when the scan electrodes are driven at the cycle of one frame, and the signal polarity of the drain lines for the specific color is inverted every two write periods when the scan electrodes are driven at the cycle of 0.5 frames.

6. The display device according to claim 1, wherein the drive circuit is configured so that:

the scan electrodes can be driven at frequencies of m Hz and k×m Hz, and the signal polarity of the drain lines for the specific color is inverted every 1/k write periods when the scan electrodes are driven at the frequency of m Hz, and the signal polarity of the drain lines for the specific color is inverted every write period when the scan electrodes are driven at the frequency of k×m Hz.

7. The display device according to claim 6, wherein the drive circuit is configured so that:

the scan electrodes can be driven at frequencies of 60 Hz and 120 Hz, and the signal polarity of the drain lines for the specific color is inverted every 0.5 write periods when the scan electrodes are driven at the frequency of 60 Hz, and the signal polarity of the drain lines for the specific color is inverted every write period when the scan electrodes are driven at the frequency of 120 Hz.

8. The display device according to claim 1, wherein the drive circuit is configured so that:

the scan electrodes can be driven at a cycle of one frame and at a cycle of 0.5 frames, and the signal polarity of the drain lines for the specific color is inverted every 0.5 write periods when the scan electrodes are driven at the cycle of one frame, and the signal polarity of the drain lines for the specific color is inverted every write period when the scan electrodes are driven at the cycle of 0.5 frames.

9. The display device according to claim 1, wherein:
the drive circuit includes a storage circuit, and
the cycle of the signal polarity inversion of the drain lines for the specific color is changed by setting a value in the storage circuit.

10. The display device according to claim 1, wherein the specific color is blue and the colors other than the specific color are red and green.

11. The display device according to claim 1, wherein the counter substrate includes touch panel sensing electrodes extending in the first direction.

12. The display device according to claim 11, further comprising a touch IC which is connected to the sensing electrodes.

13. The display device according to claim 1, wherein:
the array substrate includes a signal line selection circuit, and the drive circuit includes a positive polarity amplifier and a negative polarity amplifier, and the signal line selection circuit is configured to connect the positive polarity amplifier and the negative polarity amplifier to the drain lines for the specific color and the drain lines for the colors other than the specific color.

14. The display device according to claim 13, wherein the signal line selection circuit includes a distribution switch for dividing each horizontal period into two periods and a switch for switching the connection of the positive polarity amplifier and the negative polarity amplifier.

15. A display device comprising an array substrate, a counter substrate and a drive circuit, wherein:

the array substrate includes gate lines extending in a first direction, drain lines extending in a second direction different from the first direction, common electrodes extending in the second direction, and a gate scan circuit for driving the gate lines bidirectionally, and the counter substrate includes sensing electrodes extending in the first direction, and the common electrodes are configured to be partitioned over drain lines of pixels of a specific color and to be used also as touch panel scan electrodes, and the drive circuit is configured so that:

write periods for driving the gate lines and touch sensing periods for driving the scan electrodes are alternately repeated in each frame period, and signal polarity of drain lines for colors other than the specific color is inverted every frame, and signal polarity of drain lines for the specific color is inverted every write period, and the number of gate lines driven in the first write period can be changed.

16. The display device according to claim 15, wherein the specific color is blue and the colors other than the specific color are red and green.

17. The display device according to claim 15, wherein the counter substrate includes touch panel sensing electrodes extending in the first direction.

18. The display device according to claim 17, further comprising a touch IC which is connected to the sensing electrodes.

19. The display device according to claim 15, further comprising a liquid crystal layer which is arranged between the array substrate and the counter substrate.

20. The display device according to claim 15, wherein the drive circuit is configured so that the cycle of the signal polarity inversion of the drain lines for the specific color can be changed.

* * * * *